United States Patent
Nakasato (10) Patent No.: US 6,710,957 B2
(45) Date of Patent: Mar. 23, 2004

(54) SERVO MARK DETECTION DEVICE AND SERVO MARK DETECTION METHOD

(75) Inventor: Kazuaki Nakasato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 09/944,703

(22) Filed: Aug. 31, 2001

(65) Prior Publication Data

US 2002/0149868 A1 Oct. 17, 2002

(30) Foreign Application Priority Data

Apr. 13, 2001 (JP) ........................................ 2001-114800

(51) Int. Cl.⁷ .............................. G11B 5/09; G11B 5/596
(52) U.S. Cl. ...................................... 360/51; 360/77.04
(58) Field of Search ........................ 360/51, 53, 77.04, 360/77.08

(56) References Cited

U.S. PATENT DOCUMENTS 6,175,458 B1 * 1/2001 Carlson .................... 360/51
6,208,480 B1 * 3/2001 Tigner ..................... 360/63

FOREIGN PATENT DOCUMENTS

| JP | 61-227272 | 10/1986 |
|----|-----------|---------|
| JP | 3-144977  | 6/1991  |
| JP | 10-199170 | 7/1998  |

* cited by examiner

Primary Examiner—David Hudspeth
Assistant Examiner—Varsha A Kapadia
(74) Attorney, Agent, or Firm—Greer, Burns & Crain, Ltd.

(57) ABSTRACT

Servo marks on a storage medium such as a magnetic disk can be detected without fail by correcting misalignments or dislocations of servo gates due to an eccentricity of the storage medium, changing of read/write heads, etc. Amounts of displacements of servo marks with respect to corresponding reference positions thereof are recorded on the storage medium in advance, and an amount of displacement of each servo mark detected is read from the storage medium. A counter, which outputs the timing at which each servo gate is formed, is controlled based on the amount of displacement of each servo gate, so that a servo gate is formed at the position which is shifted by the amount of displacement read from the storage medium from a servo gate forming position corresponding to the reference position of the servo mark detected.

8 Claims, 11 Drawing Sheets

SERVO MARK DETECTION DEVICE AND SERVO MARK DETECTION METHOD

BACKGROUND OF THE INVENTION

1. Field of the Invention

The present invention relates to a servo mark detection device and a servo mark detection method for detecting servo marks recorded on a storage medium such as, for example, a magnetic disk or the like by the use of servo gates, and more particularly, it relates to a servo mark detection device and a servo mark detection method for detecting servo marks recorded on a storage medium by adjusting the phases of servo gates through positional information of the servo marks.

2. Description of the Related Art

In the past, the processing of recording servo information on a storage medium such as a magnetic disk or the like has been performed by using heads built in a magnetic disk drive unit after the storage medium had been assembled into the magnetic disk drive unit. Thus, the servo information, when read and written by the heads, is the information written concentrically with the same axis of rotation, and hence there will be no misalignment or dislocation of the servo information at the times of being written and read, with the intervals between the servo marks recorded on the storage medium being kept substantially constant.

Figure 9:
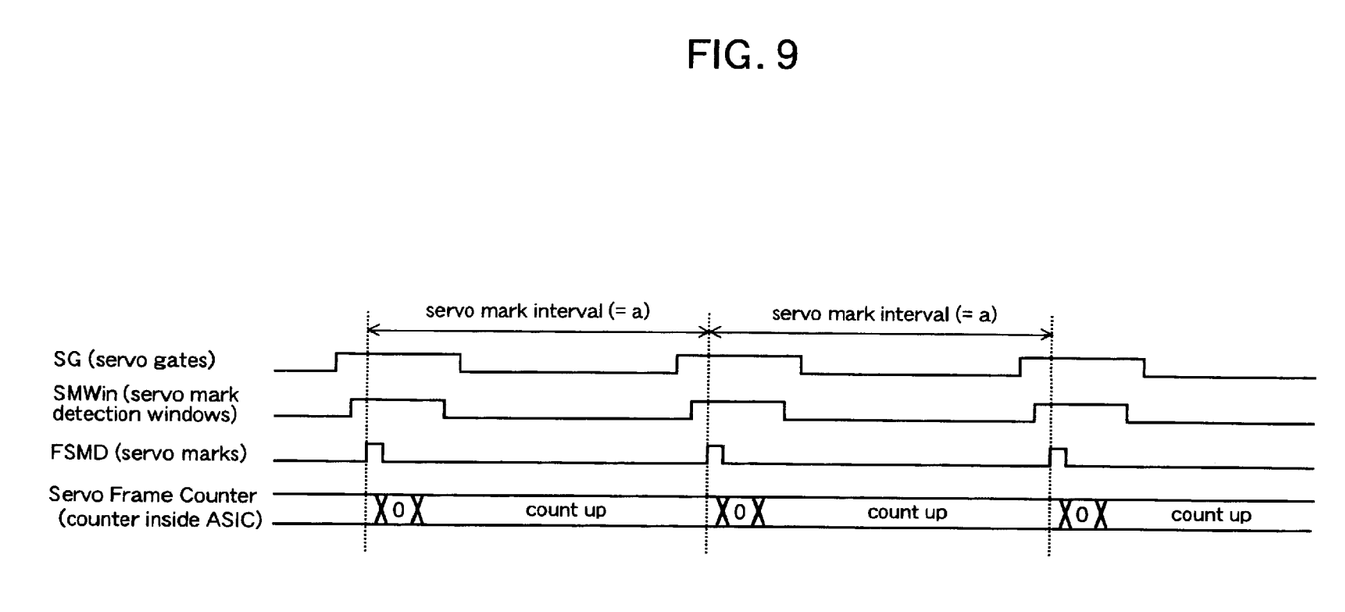
FIG. 9 is a view illustrating the states of servo gates and servo mark detection windows formed according to a known technique.

FIG. 9 illustrates the known relation of servo marks (FSMD), servo gates (SG) and servo mark detection windows (SMWin) on the same track used in an ASIC (Application Specific IC). As shown in this figure, the servo marks are read by the read heads and input to the ASIC at constant intervals (a) after a servo mark detection device is turned on. Also, the ASIC generates respective output signals such as a servo gate signal output to an RDC (Read Channel), a servo mark detection window signal used in the ASIC, etc., at constant intervals.

The ASIC asserts the servo gate signal and the servo mark detection window signal based on the values which are set to registers in the ASIC. When a servo mark is detected, it is determined whether the position of the detected servo mark is within a servo area, and when the answer to this question is positive, cylinder information, burst information and the like are read by a read head, whereby the read head is able to recognize the position of the head (cylinder) itself and perform a following or tracking operation. Moreover, when the zone on the storage medium changes in accordance with the movement of the head seeking a target cylinder, the firmware in the magnetic disk drive unit resets the output timing of the respective signals by rewriting the register values of the ASIC according to the intervals of the servo marks in that zone.

On the other hand, in recent years, disk drive units of the kind having a reduced number of storage mediums per unit (e.g., 1 platter, or 2 platters per unit) are becoming mainstreams owing to increased recording densities of the storage mediums and reduction in production costs, and hence the process of writing servo information unit by unit becomes inefficient from a viewpoint of the production time and cost. As a result, there comes to be adopted a method (called a single-disk servo track writing (STW) mode) of recording servo information on several storage mediums in a lump at one time and then assembling the storage mediums thus recorded into respective drive units.

If, however, the single-disk STW mode not used in the past is employed in this manner, there might be caused decentering or eccentricity of the storage mediums from their axis of rotation or an inclination to a device reference surface (e.g., the horizontal plane) in the assembling processes of disk drive units. In this case, servo marks are not input to the ASIC at constant intervals as in the past, thus resulting in a problem that the servo marks cannot be accurately detected by means of known circuit configurations.

Figure 10:
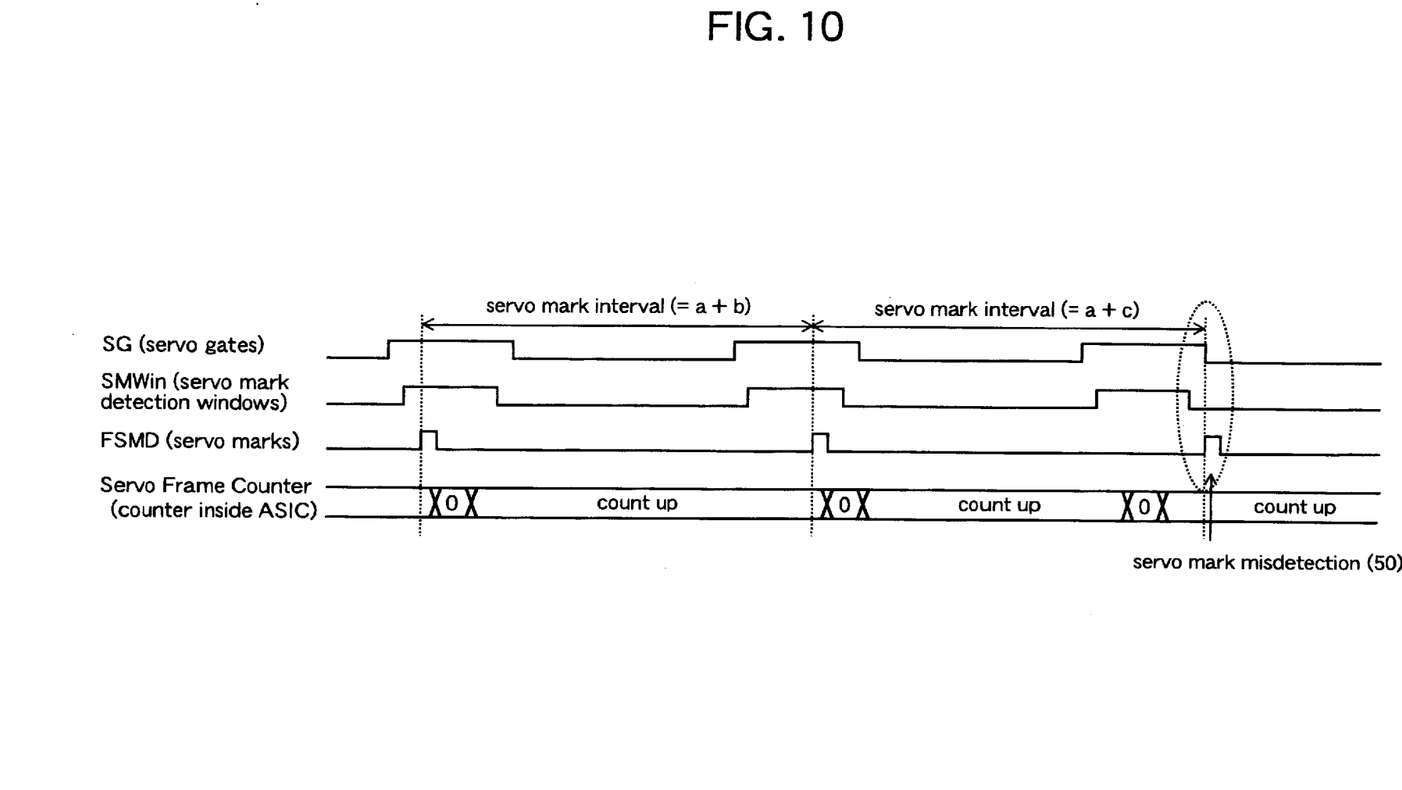
FIG. 10 is a view illustrating the state of misdetection of servo marks caused by the known technique.

FIG. 10 illustrates the relation of servo marks, servo gates and servo mark detection windows in the case where a storage medium, having been produced by the use of the single-disk STW mode, is decentered or offset from its axis of rotation. As shown in this figure, the intervals between the servo marks are (a+b), (a+c), etc., due to the eccentricity of the storage medium, where a, b and c are all assumed to be certain constants, with their relations being a>b, a>c, and b≠c. Thus, the servo mark intervals are not constant or equal to (a). In this case, if a servo mark (50) is located outside or radially outward of a corresponding servo gate (and/or a corresponding servo mark detection window), there will be misdetection of the servo mark (50).

In the case of the known ASIC's configuration, it is necessary to reset the on/off timing of the servo gates and the servo mark detection windows in order to prevent the dropped servo marks by such a cause. However, when the method of resetting the values of the registers for the servo gates and servo mark detection windows by means of the firmware is adopted, there will arise another problem in that the access time is increased, resulting in an accordingly increased overhead of the firmware.

Figure 11:
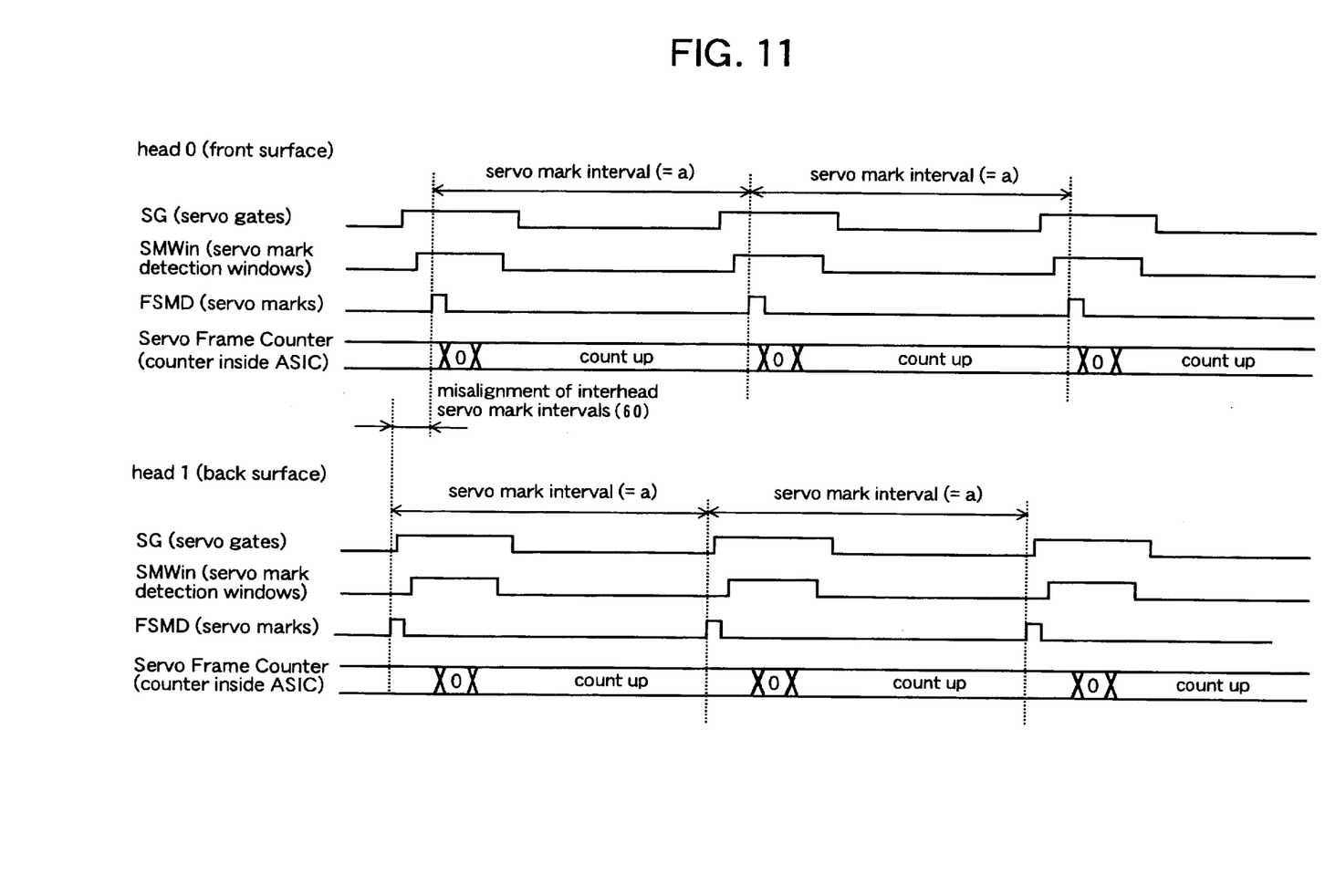
FIG. 11 is a view illustrating the state of misalignment or dislocation occurring upon changing of heads according to the known technique.

In addition, the storage medium usually has recording surfaces on the opposite sides thereof, and when the heads are changed over for reading information from one to the other recording surface, a time gap or interval might be caused due to such a head change-over operation, thus giving rise to a further problem of misalignment or dislocation. FIG. 11 illustrates one example of misalignment or dislocation which would take place when a change is made from one head 0 (e.g., one or front surface) into another head 1 (e.g., the other or back surface). As depicted in this figure, servo marks on the back surface of a storage medium cannot be detected due to misalignments or dislocations (60) of those servo marks relative to the servo gates and/or servo mark detection windows occurring upon changing of the heads. In recent years, increasing densities of storage mediums do not permit such misalignments or dislocations to be disregarded. Accordingly, it is necessary to properly correct the misalignments or dislocations in order to make the effective use of storage mediums.

SUMMARY OF THE INVENTION

The present invention has been made in view of the above-mentioned circumstances, and has for its object to provide a servo mark detection device and a servo mark detection method which can detect servo marks on a storage medium without fail by shifting the output timing of servo gates based on preset correction values thereby to correct misalignments or dislocations of servo gates occurring when the storage medium is decentered or offset from its center of rotation or when heads are changed from one to another.

In order to obviate the problems referred to above, according to the present invention, there is provided a servo mark detection device which records in advance information related to positions of servo marks (e.g., correction values such as amounts of position adjustments for correcting misalignments or dislocations of servo marks due to decentering or eccentricity of a storage medium on which the servo marks are recorded) on a storage medium at the time of manufacture thereof. When servo information is read, correction values are also read from the storage medium, so that servo gates are formed based on the correction values thus read. Specifically, timing of the servo gates is usually measured by means of an ASIC by comparing the values set in an internal counter and registers, so that a servo gate signal is turned on and off according to the timing thus set. However, the phases of the servo gates are adjusted by moving or shifting the on/off timing of the servo gate signal according to the correction values thus read. For instance, the amount of displacement (amount of phase) of each servo mark from their intended or reference position, for example represented at b or c in FIG. 10, is collected for each servo mark interval and recorded on the storage medium.

For instance, the on/off timing of the servo gate signal can be shifted by a method of temporarily stopping the internal counter by the correction values or by another method of reloading a certain value into the counter. In this manner, the detection rate of the servo marks can be improved without recreating or resetting the servo gates even if eccentricity is caused in the storage medium upon its mounting on a servo motor. The phases of the servo mark detection windows can be adjusted as in the case of the servo gates. Moreover, the above processing may be controlled by reading the correction values by means of a firmware. Alternatively, control may be carried out in such a manner that hardware internally outputs pulses or the like so as to automatically read correction values.

In addition, misalignment or dislocation of servo marks with respect to servo gates and/or servo mark detection windows upon changing of the heads can be dealt with by storing in advance correction values at the time of changing of the heads in the storage medium and reading the correction values so as to adjust the phases of the servo gates and/or the servo mark detection windows. To this end, correction values for both of the dislocations due to eccentricity and those caused upon changing of the heads are collected and stored in advance, whereby the phases of servo gates can be adjusted by using the eccentricity-based correction values alone before the heads are changed from one to another, alternatively by using both the eccentricity-based correction values and the head-change-based correction values after the changing of the heads, thus making it possible to drastically enhance the servo mark detection ratio.

According to one aspect of the present invention, there is provided a servo mark detection device for forming servo gates to detect servo marks recorded on a storage medium, the device comprising: a reading section for reading information on the positions of the servo marks from the storage medium on which the information on the positions of the servo marks has been recorded in advance; and a servo gate forming section for forming the servo gates based on the information on the positions of the servo marks read by the reading section. In an embodiment of the invention, the servo gate forming section comprises an MPU, registers, a counter, comparators and a firmware. In addition, a timing forming circuit may be employed in place of the firmware.

In a preferred form of the present invention, the information on the positions of the servo marks comprises an amount of displacement of each servo mark with respect to a reference position thereof. The servo gate forming section changes the position of each servo gate to be formed from a servo gate forming position corresponding to the reference position of a corresponding servo mark to a position corresponding to the amount of displacement of the corresponding servo mark.

In another preferred form of the present invention, the amount of displacement of a servo mark to the reference position thereof includes at least one of an amount of misalignment of the servo mark due to an eccentricity of the storage medium occurring upon assembling the storage medium into a disk drive unit, and an amount of misalignment of the servo mark occurring when read/write heads for the storage medium are changed from one to another.

In a further preferred form of the present invention, the servo gate forming section comprises: a counting section for outputting servo gate formation timing when counting a predetermined number of clocks; and a count control section for controlling a counting operation of the counting section based on the information on the positions of the servo marks.

In a yet further preferred form of the present invention, the counting section comprises: a counter for counting the predetermined number of clocks; a count value setting section for setting the predetermined number of clocks to be counted by the counter; and a comparator for comparing a count value of the counter with the predetermined number of clocks set by the count value setting section thereby to output a servo gate forming timing.

In a still further preferred form of the present invention, the count control section controls the counting section in such a manner that the counter of the counting section is stopped or incremented based on the information on the positions of the servo marks.

In a further preferred form of the present invention, the servo mark detection device further comprises a storage section for storing, for a predetermined number of servo marks, the information on the positions of the servo marks recorded on the storage medium. The reading section stores in the storage section the information on the positions of the predetermined number of servo marks read from the storage medium, and the servo gate forming section forms the servo gates based on the information on the positions of the predetermined number of servo marks stored in the storing section. In an embodiment of the invention, the storage section corresponds to a buffer, and the reading section corresponds to a head.

According to another aspect of the present invention, there is provided a servo mark detection method for forming servo gates to detect servo marks recorded on a storage medium, the method comprising: a first step of reading information on the positions of the servo marks from the storage medium in which the information on the positions of the servo marks is recorded in advance; and a second step of forming the servo gates based on the information on the positions of the servo marks read by the reading step.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings. Embodiment 1.

Figure 1:
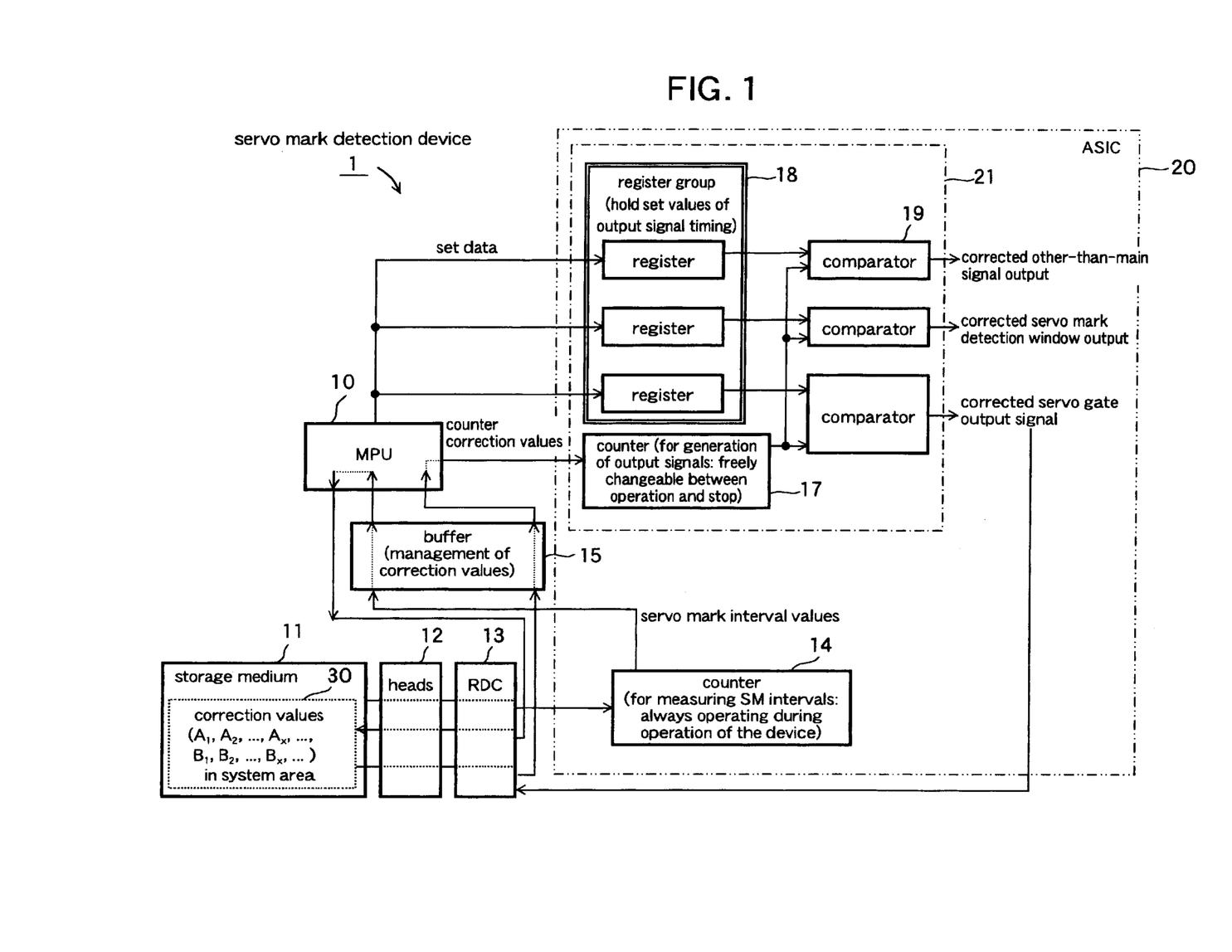
FIG. 1 is a block diagram schematically illustrating the basic configuration of a servo mark detection device according to the present invention.

FIG. 1 briefly illustrates, in a block diagram, the basic configuration of a servo mark detection device constructed in accordance with a first embodiment of the present invention. In this figure, the servo mark detection device, generally designated at 1, is to form a servo gate and a servo mark detection window thereby to detect a servo mark indicative of a recording start position of servo information. Various functions of the servo mark detection device, including the formation of a servo gate and a servo mark detection window, are performed and controlled by an MPU 10. In addition, the servo mark detection device 1 includes a storage medium 11 such as a magnetic disk or the like, read/write heads 12 for performing reading and writing operations with respect to the storage medium 11, an RDC 13 for decoding the data which is read by the heads 12, and a buffer 15 for temporarily storing the data which is fetched from the RDC 13. In addition, the servo mark detection device 1 further includes an ASIC 20 which comprises a counter 14 for measuring the intervals between adjacent servo marks, and a signal forming section 21 for forming various signals. The signal forming section 21 comprises a counter 17, a group of registers 18, and a group of comparators 19, all of which cooperate with one another to output a variety of signals such as a servo gate signal, a servo mark detection window signal, etc., at appropriate timing.

The storage medium 11 has a system area in which is stored counter correction values for adjusting the phases of servo gates. The counter correction values read by the heads 12 is stored in the buffer 15. The MPU 10 reads the counter correction values in the buffer 15, and controls the counter 17.

Here, note that the signal forming section 21 operates in close association with the operation of the counter 14. That is, according to the present invention, a firmware for correcting a misalignment or dislocation of the storage medium 11 is stored in a storage element (not shown) such as a ROM or the like in the servo mark detection device 1. The MPU 10 executes the firmware in such a manner that the counter 17 is controlled to measure timing and output a servo gate signal, etc., as mentioned above, while taking account of counter correction values for misalignments or dislocations between the servo mark intervals and the servo marks.

Figure 2:
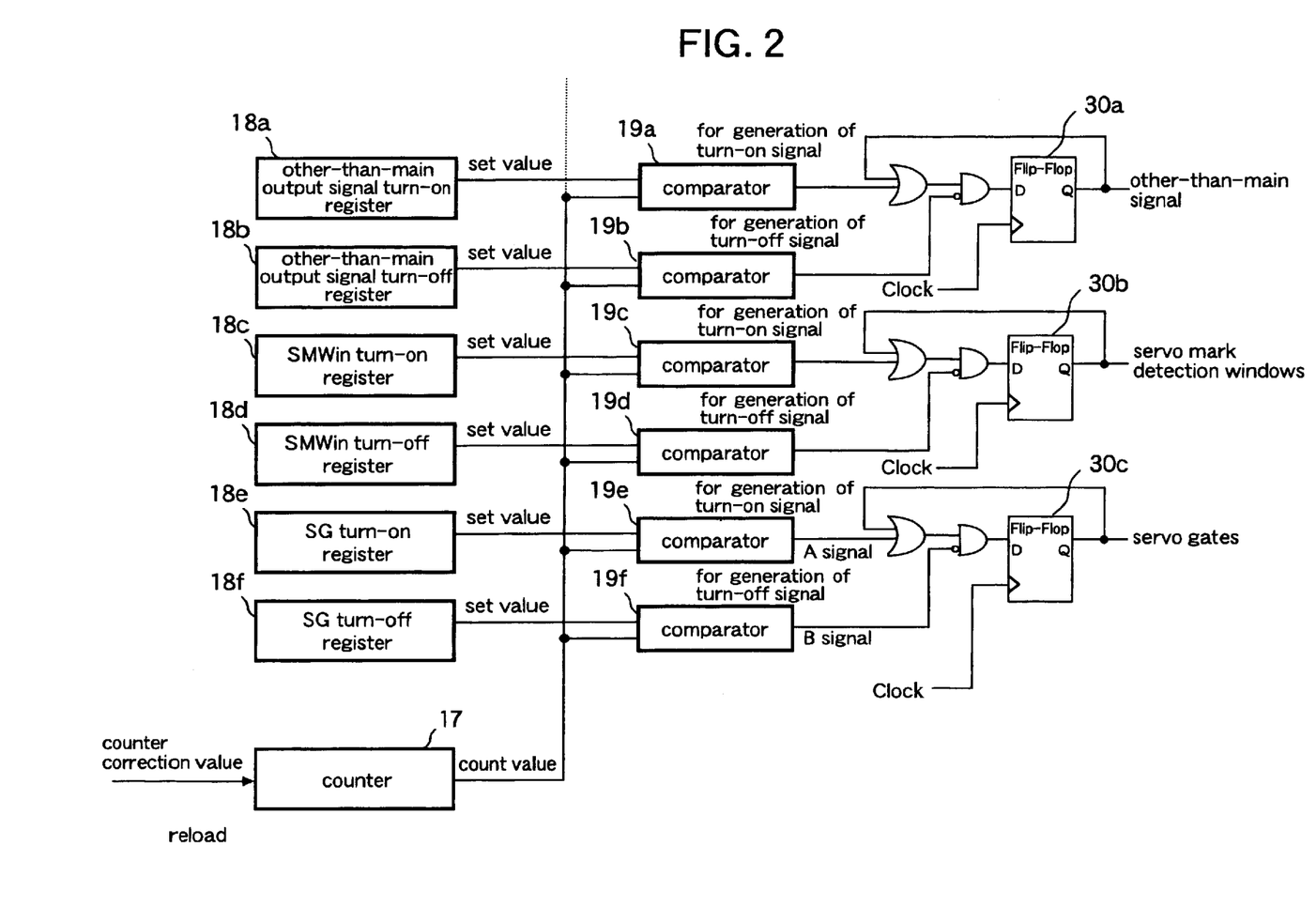
FIG. 2 is a block diagram illustrating the details of the configuration of the servo mark detection device.

FIG. 2 is a block diagram showing part of the signal forming section 21 in more detail. The group of registers 18 comprises, as shown in FIG. 2 from the top downward, an other-than-main output signal turn-on register 18a for turning on other-than-main output signals (i.e., signals other than the main signals (servo gate signal and servo mark detection window signal) of the present invention), an other-than-main output signal turn-off register 18b, a servo mark detection window (SMWin) turn-on register 18c, a servo mark detection window (SMWin) turn-off register 18d, a servo gate (SG) turn-on register 18e, and a servo gate (SG) turn-off register 18f. These registers respectively store the register values given by the MPU 10. Also, the group of comparators 19 comprises comparators 19a–19f for making comparisons between the count value of the counter 17 and the values of the corresponding registers, respectively, to output turn-on or turn-off signals. The signal forming section 21 further comprises a first flip-flop 30a that receives the signal output from the comparator 19a or 19b and outputs an "other-than-main output signal" as referred to above, a second flip-flop circuit 30b that receives the signal output from the comparator 19c or 19d and outputs a servo mark detection window signal, and a third flip-flop circuit 30c that receives the signal output from the comparator 19e or 19f and outputs a servo mark signal.

Figure 3:
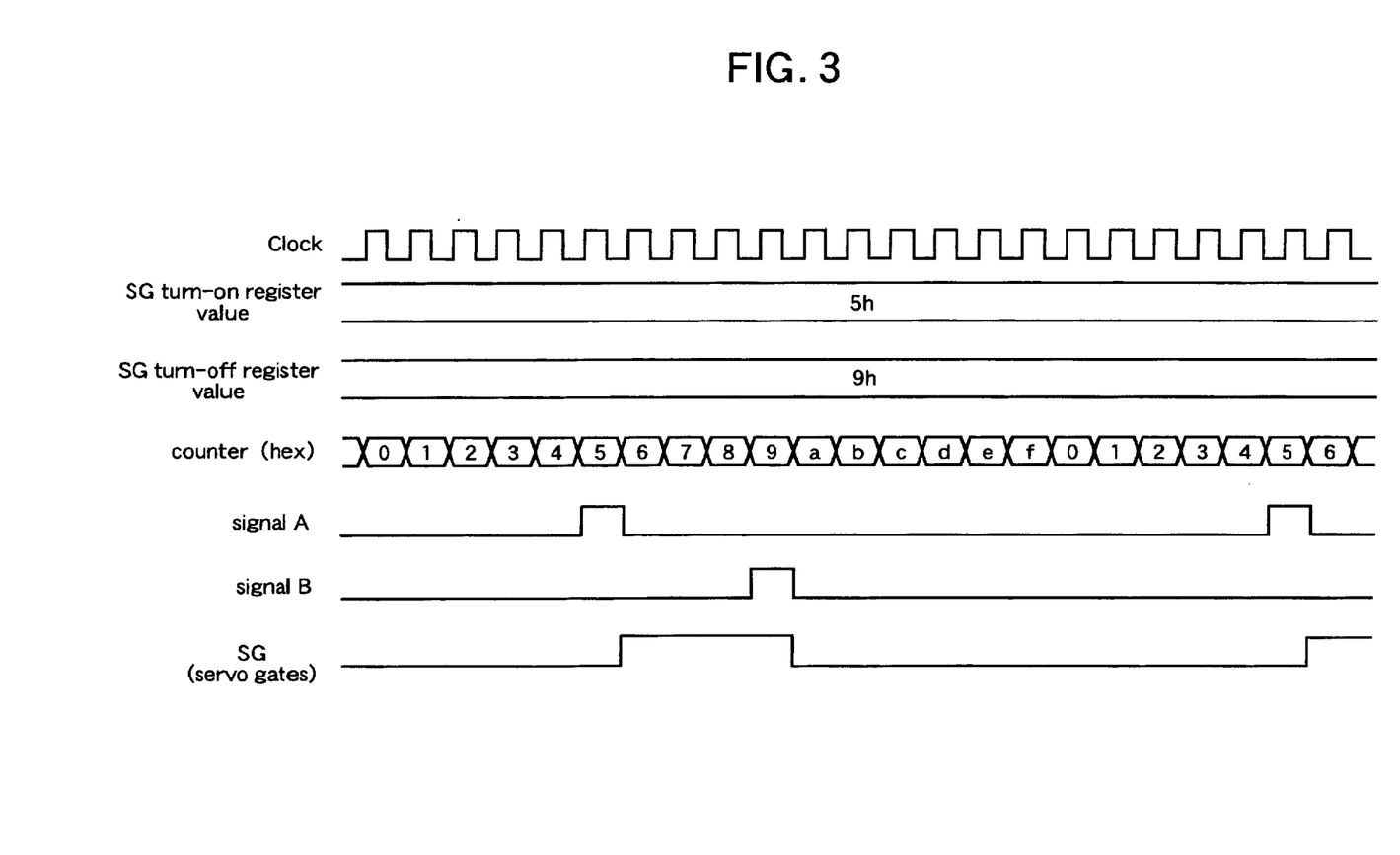
FIG. 3 is a timing chart explaining a servo gate forming mechanism.

First, a mechanism for forming a general servo gate will be described using the servo mark detection device 1 while referring to FIG. 2 and FIG. 3. As illustrated in these figures, the MPU 10 sets in advance the timing of the servo gate turn-on register 18e and the servo gate turn-off register 18f at which servo gate signals are output therefrom. As shown in FIG. 3, a value "5h" is set to the servo gate turn-on register 18e, and a value "9h" is set to the servo gate turn-off register 18f. When either of the values of these registers 18e, 18f coincides with the count value of the counter 17 in FIG. 3, the corresponding comparator 19e or 19f is operated to output a signal to form a servo gate. That is, when the count value of the counter 17 reaches 5h, the comparator 19e outputs a servo gate turn-on signal, designated at "signal A" in FIG. 3, whereas when the count value of the counter 17 reaches 9h, the comparator 19f outputs a servo gate turn-off signal, designated at "signal B" in FIG. 3, thus forming a servo gate (SG) as shown in this figure. In this connection, note that a clock (not shown) in the device 1 is always operating for synchronization of every elements thereof. Even if a servo gate is formed as shown in FIG. 3, there might be the case where a servo mark, being misaligned or dislocated from its intended or correct position due to an eccentricity, etc., of the storage medium 11 on which the servo mark is recorded, can not be detected. In such a case, however, according to the present invention, the phase of the servo gate is adjusted by moving or shifting the output timing of the servo gate turn-on and/or turn-off signals.

Figure 4:
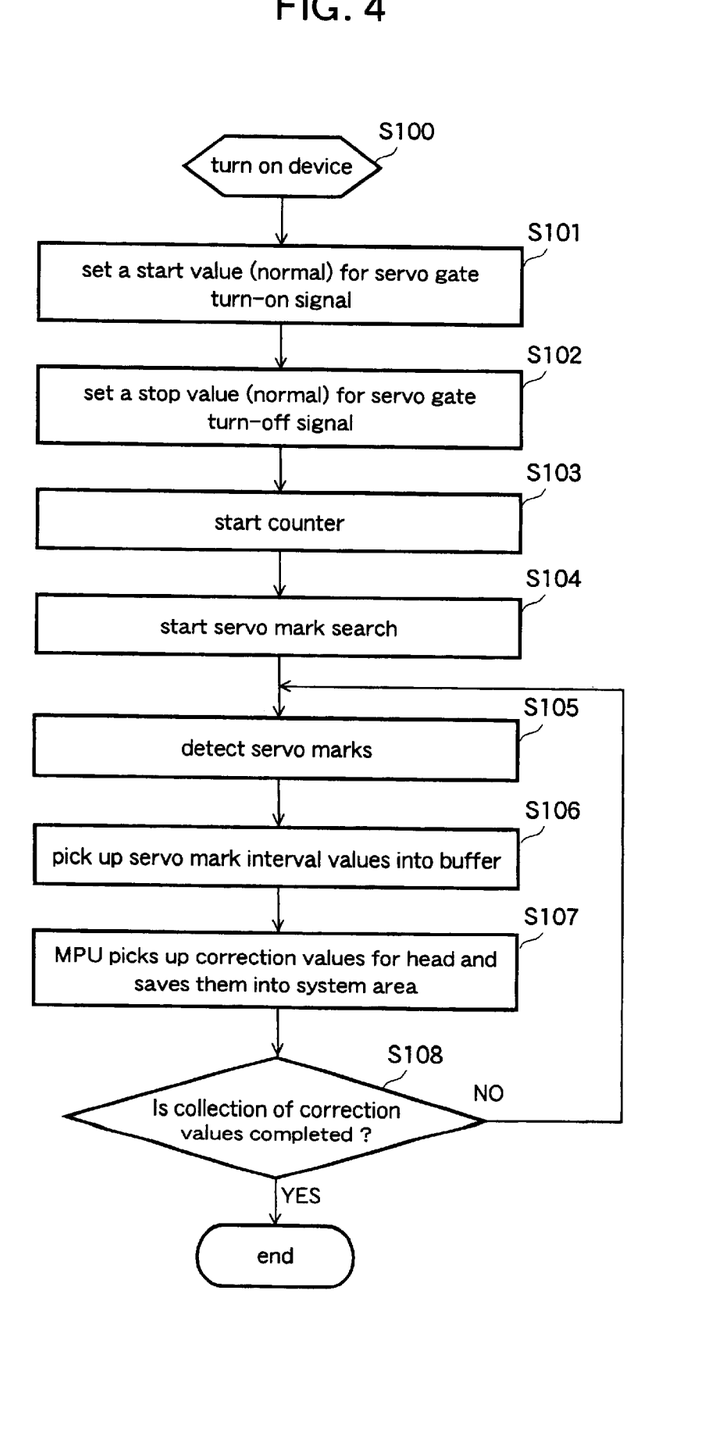
FIG. 4 is a flow chart illustrating the flow of counter correction value collection processing.
Figure 5:
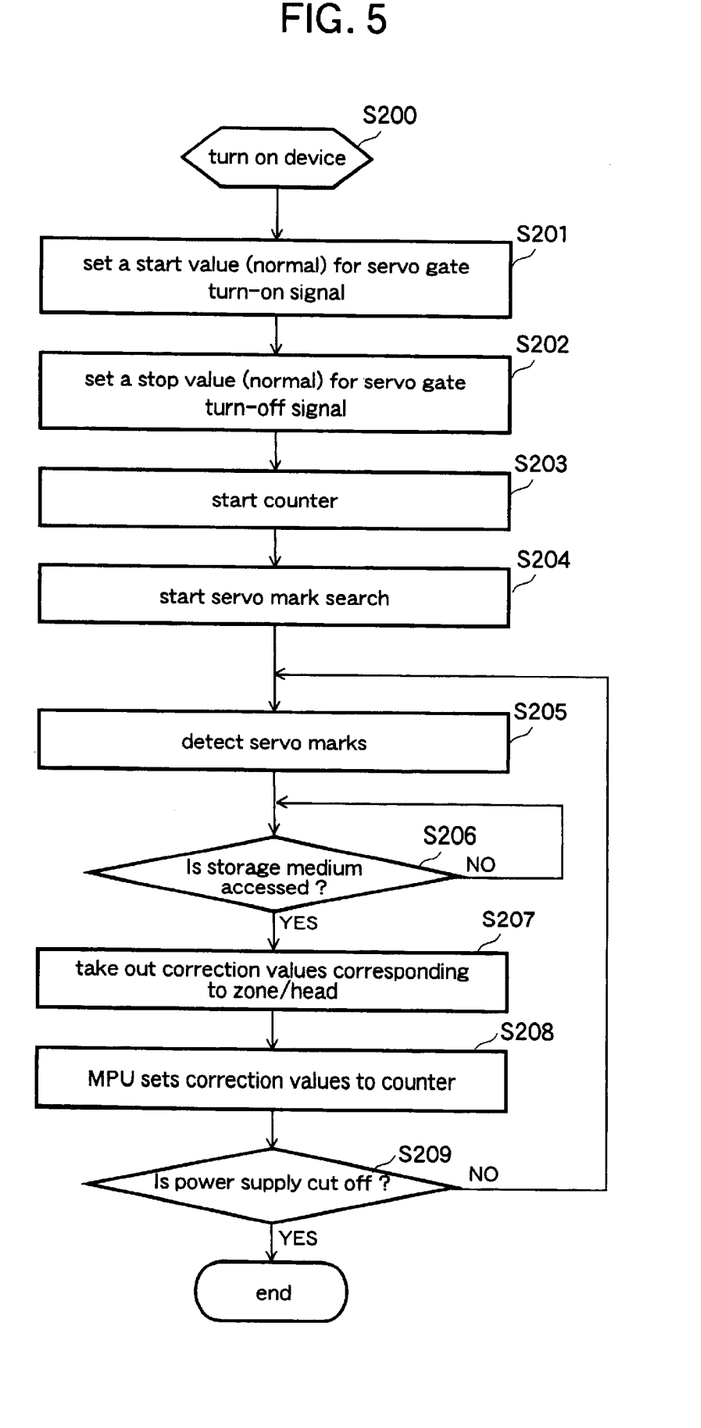
FIG. 5 is a flow chart illustrating the flow of servo gate forming processing.

FIG. 4 is a flow chart illustrating the collection of counter correction values performed during manufacturing of the storage medium 11, and FIG. 5 is a flow chart illustrating phase adjusting processing performed in this embodiment based on the correction values collected. Hereinafter, the flow of the phase adjusting processing in this embodiment will be described in detail using these flow charts.

First, reference will be made to the counter correction value collection processing performed at the time of manufacture of the storage medium 11 of FIG. 4. After the device 1 is turned on or started (in step S100), a start value is set for the servo gate turn-on signal (in step S101), and a stop value is set for the servo gate turn-off signal (in step S102). Then, the counter 14 is started (in step S103). Subsequently, a search is made for detecting servo marks on the storage medium 11 by means of the heads 12 (in step S104). When servo marks are detected (in step S105), servo mark interval values are picked up to the buffer 15 (in step S106), and the MPU 10 fetches counter correction values for the heads 12 and saves them in the system area of the storage medium 11 (in step S107). If the collection of the counter correction values has not yet been completed at this time ("NO"in step S108), processing from step S105 to step S107 is repeated. When the counter correction values for all the servo marks have been collected ("YES"in step S108), the entire processing is ended. Here, note that the correction values thus collected for adjusting the counter represent, in concrete terms for example, the amounts of displacement of the servo marks on the storage medium 11 with respect to the reference positions of the normal or correct servo marks set to the registers.

Next, reference will be made to the processing of adjusting the phases of the servo gates misaligned or dislocated by an eccentricity of the storage medium 11 (e.g., eccentric mounting of the storage medium 11 on the rotating shaft or spindle of the servo motor) while using the correction values collected by the flows of FIG. 4 and FIG. 5. First of all, after start of the device 1 (in step S200), a start value is set for the servo gate turn-on signal (in step S201), and a stop value is set for the servo gate turn-off signal (in step S202). Then, the counter 14 is started (in step S203). Subsequently, a search is carried out to detect servo marks on the storage medium 11 (in step S204). When the servo marks are detected (in step S205), it is determined whether the storage medium 11 is accessed (in step S206). When the storage medium 11 is not accessed ("NO"in step S206), the operation becomes a waiting state until the hard disk is accessed. When the storage medium 11 is accessed ("YES"in step S206), a correction value corresponding to the zone/head of the storage medium 11 accessed is taken out (in step S207). The MPU 10 sets the counter correction value thus taken out to the counter 17 (in step S208).

Specifically, the counter 17 is made to stop counting by the correction value, or the processing of reloading the counter is performed, whereby the output timing of a servo gate signal is shifted. Thus, the servo gate signal is output with its timing or phase being properly shifted (in step S209). The processing from step S205 to step S208 is repeated until the power supply is cut off (in step S210). Here, note that when a misalignment or displacement of servo mark intervals is to be adjusted in a negative direction of the time base (i.e., in a direction in which the servo mark intervals become narrower), the counter is reloaded. On the other hand, when the servo mark intervals are to be adjusted in a positive direction (i.e., in a direction in which the servo mark intervals become wider), the counter is stopped. In addition, the counter correction values are usually developed into the buffer 15 temporarily in order to reduce the access time, and the MPU 10 reads from the buffer 15 a correction value corresponding a misalignment or dislocation of a servo mark interval while measuring timing between adjacent servo marks, and sets the correction value thus read to the counter 17. However, the counter correction values may be read from the storage medium 11 one by one instead of being developed into the buffer 15.

Figure 6:
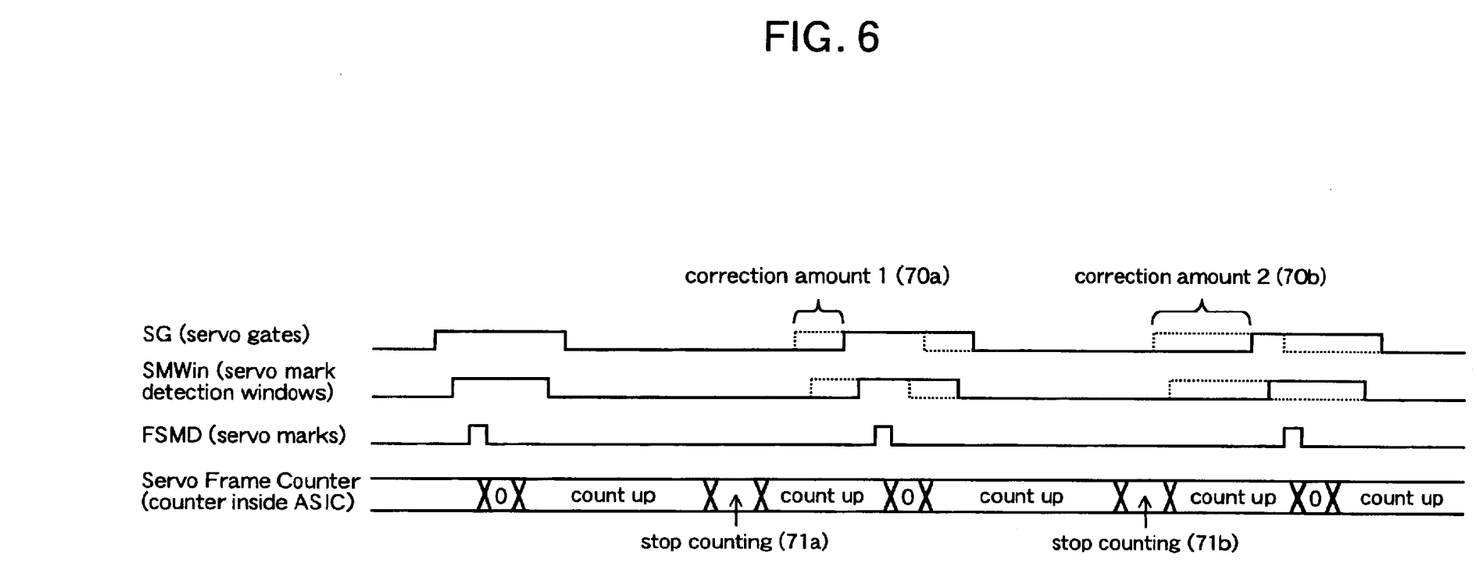
FIG. 6 is a view illustrating the state in which the phases of servo gates are adjusted under the control of a counter.

FIG. 6 shows the case where the above processing is executed to adjust misalignments or dislocations of servo gates and servo mark detection windows, which are caused by misalignments or dislocations of servo marks occurring in a known technique. In this figure, the portions drawn by dotted lines represent original reference positions of the servo gates and servo mark detection windows. The solid lines represent the corrected positions of the servo gates and the servo mark detection windows shifted by the amounts (i.e., the amounts of phases corresponding to misalignments or dislocations of the servo marks and the servo mark detection windows with respect to the servo marks) corresponding to the amounts of misalignments or dislocations of the servo marks from their reference positions. In this embodiment, when an amount of correction corresponding to a misalignment or dislocation (e.g., an amount of correction 1 (70a) in FIG. 6) is set to the counter 17, the counter 17 stops counting by the amount of correction 1 (70a)(see (71a) in FIG. 6). Similarly, when an amount of correction 2 (70b) is set to the counter 17, the counter 17 stops counting by an amount of correction 2 (70b) (see (71b) in FIG. 6).

In this manner, it is possible to arbitrarily adjust shifts in the servo mark intervals in both the positive and negative directions of the time base by means of the firmware. In addition, a table including servo mark intervals may be stored in an external memory, so that the ASIC can read information on the servo mark intervals from the external memory without any intervention of a firmware thereby to adjust the respective output timing of the servo gate signal and the servo mark detection window signal at each servo mark interval. According to such processing, it is possible to enhance the servo mark detection rate while decreasing the load of the firmware. Embodiment 2.

Figure 7:
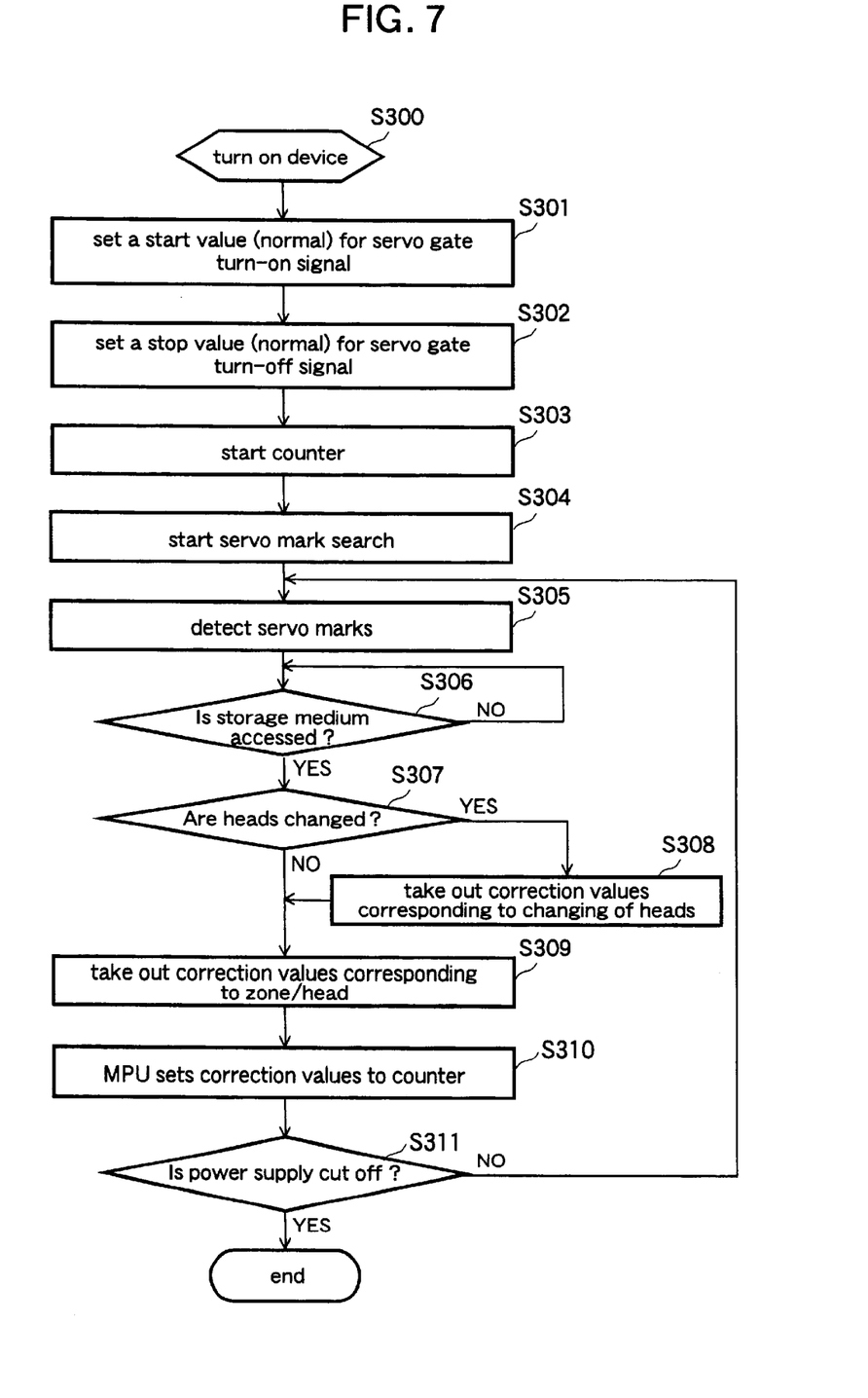
FIG. 7 is a flow chart illustrating the flow of correction processing when the heads are changed from one to another.

The correction of such misalignments or dislocations as explained in the first embodiment is even applicable to the case where a misalignment or dislocation is not caused by an eccentricity of the storage medium 11 but by a time lag upon changing of the read/write heads 12. In FIG. 5, upon collecting correction values, the correction values for changing of the heads 12 are also collected and recorded on the storage medium 11. In addition, the processing shown in a flow chart of FIG. 7 is carried out in the actual phase adjustment of the servo gates. This flow chart is basically similar to that of FIG. 5. However, in the processing of FIG. 7, a determination is made whether there takes place a head change (in step S307). When the heads are changed from one to another ("YES"in step S307), the buffer 15 is read so that a correction value for the head change is obtained and set to the counter 17 (in step S308) in addition to a correction value for an eccentricity of the storage medium 11 being read out from the buffer 15 and set to the counter 17 (in step S309). A servo signal is output at the timing which is adjusted by the correction value for the eccentricity added by the correction value for the head change. Embodiment 3.

Figure 8:
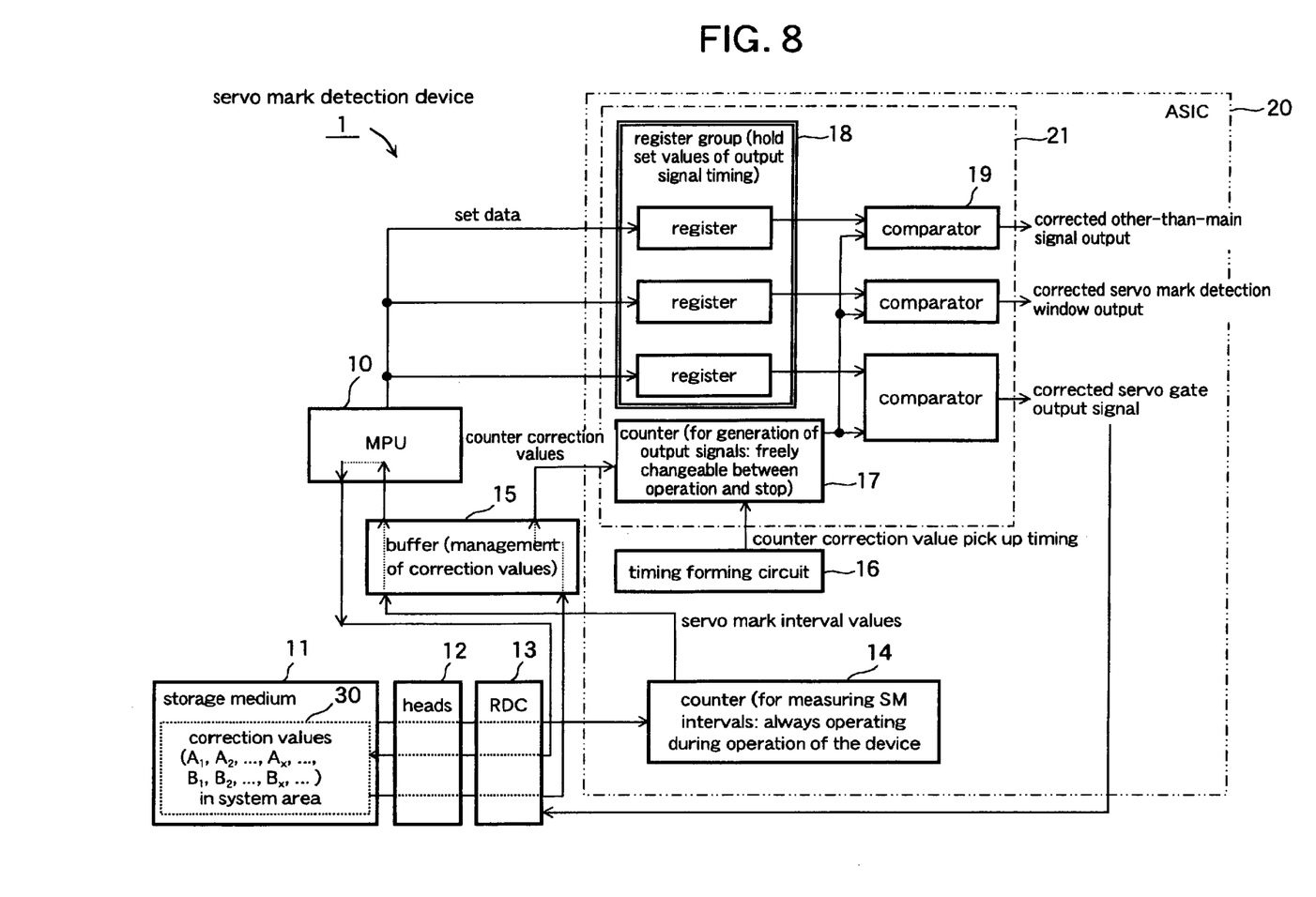
FIG. 8 is a block diagram briefly illustrating the basic configuration of the servo mark detection device when the counter is controlled by means of hardware.

Moreover, it is also possible to adjust the phases of the servo gates and the servo mark detection windows by controlling the counter 17 by means of hardware alone without using any firmware. FIG. 8 illustrates the configuration of a servo mark detection device suitable for use in such a case. In this figure, a timing forming circuit 16 is incorporated in the device 1 so that the timing at which the counter correction values are fetched from the buffer 15 is controlled by the timing forming circuit 16 in place of the firmware. Here, note that the operation of this device is similar to the case in which control is carried out by the firmware as referred to above.

Although various embodiments of the present invention have been shown and described herein, the present invention is not limited to these embodiments, but changes or modifications thereof can of course be made without departing from the spirit or scope of the invention as claimed in the appended claims.

As described in the foregoing, the present invention can achieve the following excellent advantages.

According to the present invention, information for adjusting misalignments or dislocations of servo marks caused by an eccentricity of a storage medium such as a magnetic disk, etc., or by changing of read/write heads are recorded in advance on the storage medium, so that the information thus recorded is read from the storage medium to control a counter, thereby enabling the output timing of a servo gate signal to be shifted in accordance with a misalignment or dislocation of each servo mark. Accordingly, the phases of the servo gates are properly adjusted, thus making it possible to carry out the detection of the servo marks without fail. Therefore, even if there take place misalignments or dislocations of the servo marks due to an eccentricity of the storage medium or changing of the heads, it is not necessary to reset registers for forming servo gates. As a result, it is possible to prevent an increase in the overhead of the device, thus improving the detection rate of the servo marks. Moreover, the information on misalignments or dislocations read from the storage medium is temporarily stored in a storage section such as a buffer, so that the information can be read from the buffer, thereby speeding up the adjustment of the phases and reducing the load of the device itself as well in comparison with the case in which all the pieces of information are read out piece by piece. In addition, since a misalignment or dislocation occurring when the heads are changed from one to another can be corrected, it is possible to make effective use of those areas of the storage medium which have conventionally been out of use. Thus, this is particularly useful for magnetic disks whose densities of records are increasing at a high rate in recent years.

What is claimed is:

1. A servo mark detection device for forming servo gates to detect servo marks recorded on a storage medium, said device comprising:

a reading section for reading information on the positions of said servo marks from said storage medium on which said information on the positions of said servo marks has been recorded in advance; and a servo gate forming section for forming said servo gates based on said information on the positions of said servo marks read by said reading section.

2. The servo mark detection device according to claim 1, wherein said information on the positions of said servo marks comprises an amount of displacement of each servo mark with respect to a reference position thereof, and said servo gate forming section changes the position of each servo gate to be formed from a servo gate forming position corresponding to said reference position of a corresponding servo mark to a position corresponding to said amount of displacement of said corresponding servo mark.

3. The servo mark detection device according to claim 2, wherein said amount of displacement of a servo mark to said reference position thereof includes at least one of an amount of misalignment of said servo mark due to an eccentricity of said storage medium occurring upon assembling the storage medium into a disk drive unit, and an amount of misalignment of said servo mark occurring when read/write heads for said storage medium are changed from one to another.

4. The servo mark detection device according to claim 1, wherein said servo gate forming section comprises:

a counting section for outputting servo gate formation timing when counting a predetermined number of clocks; and a count control section for controlling a counting operation of said counting section based on said information on the positions of said servo marks.

5. The servo mark detection device according to claim 4, wherein said counting section comprises:

a counter for counting said predetermined number of clocks; a count value setting section for setting said predetermined number of clocks to be counted by said counter; and a comparator for comparing a count value of said counter with said predetermined number of clocks set by said count value setting section thereby to output a servo gate forming timing.

6. The servo mark detection device according to claim 5, wherein said count control section controls said counting section in such a manner that said counter of said counting section is stopped or incremented based on said information on the positions of said servo marks.

7. The servo mark detection device according to claim 1, further comprising a storage section for storing, for a predetermined number of servo marks, said information on the positions of said servo marks recorded on said storage medium, wherein said reading section stores in said storage section said information on the positions of said predetermined number of servo marks read from said storage medium, and said servo gate forming section forms said servo gates based on said information on the positions of said predetermined number of servo marks stored in said storing section.

8. A servo mark detection method for forming servo gates to detect servo marks recorded on a storage medium, said method comprising:

a first step of reading information on the positions of said servo marks from said storage medium in which said information on the positions of said servo marks is recorded in advance; and a second step of forming said servo gates based on said information on the positions of said servo marks read by said reading step.

* * * * *